Dec. 1, 1964   D. SILVERMAN   3,159,231
SEISMIC SURVEYING UTILIZING MODELS
Filed Nov. 9, 1959   5 Sheets-Sheet 1

INVENTOR.
DANIEL SILVERMAN
BY Newell Pottorf
ATTORNEY

INVENTOR.
DANIEL SILVERMAN
BY
ATTORNEY

INVENTOR.
DANIEL SILVERMAN

Dec. 1, 1964  D. SILVERMAN  3,159,231
SEISMIC SURVEYING UTILIZING MODELS
Filed Nov. 9, 1959  5 Sheets-Sheet 4

INVENTOR.
DANIEL SILVERMAN
BY *Newell Pottoff*
ATTORNEY 3,159,231
SEISMIC SURVEYING UTILIZING MODELS
Daniel Silverman, Tulsa, Okla., assignor to Pan American Petroleum Corporation, Tulsa, Okla., a corporation of Delaware
Filed Nov. 9, 1959, Ser. No. 851,604
19 Claims. (Cl. 181—.5)

This invention relates to seismic geophysical surveying and is directed to a system for modeling the earth's layered subsurface and to a method of prospecting utilizing such a model for distinguishing between desired and undesired waves. More specifically, the invention is directed to a method and apparatus for making and utilizing synthetic seismograms for discrimination against multiply reflected waves received in seismic reflection prospecting.

It has been for some time generally recognized that the waves received in the course of seismic geophysical surveying for minerals such as oil and gas are often a complex mixture of overlapping impulses from many small discrete sources. Some degree of success at identifying the specific sources of certain complex seismic reflection wave forms has been had by the so-called "Seisyn" process or apparatus as described by Peterson et al. in Geophysics, vol XX, 1955, pp. 516 to 538.

Thus, Peterson has shown how the complex wave forms of field seismograms are related to the variations of continuous interval velocity logs, which are frequently referred to in the literature as CVL's. As he makes clear, however, it is not the velocity alone, but the change in the product of velocity and density, commonly called the acoustic impedance, that determines the reflecting property of each boundary between different rock strata. The travel times of events recorded on field seismograms, on the other hand, depend only on the velocities and thicknesses of the subsurface rock layers, which quantities are both ascertainable directly from the CVL. Likewise, the CVL provides the basic data from which the travel time of seismic waves through any single rock stratum can be calculated.

Ideally, for computing synthetic seismograms, a log or plot of acoustic impedance as a function of two-way travel time would probably be preferable. Reflection coefficients at the stratum interfaces and reflection times could then be rigorously determined. Peterson has shown, however, that several approximations are frequently permissible, in that change in the logarithm of acoustic impedance may be used as the reflection coefficients, the velocity alone may be used in place of the acoustic impedance, and depth may sometimes be used instead of travel time.

In reading this specification and the appended claims, it may be noted that the terms "acoustic" well log, "acoustic impedance" log, "continuous velocity" log, and the like have often been used as synonyms. It should be understood, however, that the same order of preference applies here as in Peterson. Acoustic impedance and two-way travel time are the preferred function variables but time, depth, and velocity or logarithm of velocity may be used as approximations with the limitations that are well known.

The Peterson process and apparatus is subject to the drawback that the superposition of pulses composing the complex received wave form is limited to intervals of depth or time which correspond to the pulse length or duration. In other words, the instantaneous wave amplitude observed by Peterson at the ground surface of his model at any instant of time is the summation of the effects of only those reflecting interfaces acting upon the input pulse at one previous instant of time. This excludes multiply reflected energy from consideration, as its travel path may utilize shallower interfaces far removed from the group of interfaces spanned by the down-travelling impulse at any instant of time.

It is well known, however, that the seismic reflection wave patterns actually observed in nature may be due either to primary or multiply reflected impulses or to both. Primary reflections are considered to be those where the seismic energy has undergone only one reversal in direction of its ray or travel path. That is, a primary reflection is assumed to be an impulse which has traveled once downwardly and once upwardly to the ground surface where it is received.

Multiple reflections, on the other hand, are considered to be due to waves or impulses which have undergone two or more reversals in direction of travel in their path between the source and receiver. They therefore include what are sometimes called secondary or "ghost" reflections, where the energy has traveled initially upwardly from the source to a reflector thereabove, such as the ground surface or the base of the weathered layer, before traveling downwardly to a primary reflection interface and thence back to the ground surface for recording. Multiple reflections also include impulses or waves which have reverberated one or more times between two spaced reflecting interfaces, in addition to one traverse downward to maximum depth and one traverse from there to the surface for recording. Due to its increased length of travel path, a multiply reflected wave may therefore arrive at the same time as, and interfere with, a primary reflection from a deeper interface. Regardless of whether the multiple reflection interferes with a true primary reflection or has itself the appearance of a primary reflection, it is an undesirable wave in that it does not uniquely indicate the direct travel time to any reflecting interface as a primary reflection does.

It is accordingly a primary object of my invention to provide a novel method and apparatus for use in seismic geophysical prospecting for discrimination against, and detection or elimination of, multiply reflected seismic energy. A further object of the invention is to provide an adjustable seismic model which essentially duplicates the functions of the layered earth in producing both primary and multiple reflections of seismic impulses. Another object is to provide a method and apparatus for utilizing such models to distinguish between primary and multiple seismic reflection energy, so as to emphasize the primary reflections at the expense of the multiples. A still further object of the invention is to provide a reflection seismogram wave-form model which is completely flexible as to its possible adjustment in accordance with an acoustic well log in a simple and easy manner, with a minimum of independent controls for wave travel time and boundary reflection conditions for the various subsurface layers. Other and further objects, uses, and advantages of the invention will become apparent as the description proceeds.

Briefly stated, the foregoing and other objects are accomplished by a seismic model which comprises a plurality of coupled wave-transmission units, each unit of which is independently adjustable to provide a wave travel time therethrough proportional or equal to the travel time of a seismic wave through a corresponding subsurface earth layer which the transmission unit is designed to simulate. The various transmission units are coupled together into a series arrangement by coupling elements, each of which elements is individually adjustable to simulate the boundary conditions between the two adjacent beds respectively modeled by the connected transmission units, in accordance with values either assumed for the boundary conditions or as determined from an acoustic impedance log of the subsurface.

More specifically, each coupling unit includes means for dividing the signal simulating the seismic impulse and emerging from a transmission unit into two portions, one of which represents that part transmitted across the subsurface boundary into the next adjacent layer and the other of which represents the reflected portion of seismic energy which does not cross the subsurface boundary but is reversed in its direction of travel and re-traverses the same layer. Means are also provided for determining the phase of this reflected-wave portion, since its phase with respect to the energy incident upon the boundary is the same or opposite depending upon the change of acoustic impedance at the modeled boundary in the direction of travel of the incident energy, namely, whether the acoustic impedance change is positive or negative.

With such a model adjusted in accordance with the variations observed on an acoustic impedance log or, what is commonly considered an approximation thereto, a continuous velocity log recorded in a deep well, a pulse of the same form as the seismic-wave impulse observed traveling through the layered earth or some variation of that form, is inserted into the model network and transmitted therethrough. Reflections occur in the model network at each of the model boundaries in accordance with the reflection of the corresponding seismic impulse in the layered earth which is approximated by the model. The output wave form of the model accordingly closely resembles the reflection seismogram trace which is observed in the course of geophysical surveying in a conventional manner at the location where the acoustic impedance or seismic velocity log was recorded.

Since the model thus duplicates as closely as possible the boundary conditions and the spacing in time of the various interfaces between subsurface layers, this synthetic seismogram trace, like the real seismogram trace observed in field recording, includes both primary and multiply reflected energy. In the event the synthetic seismogram trace does not substantially exactly duplicate the recorded field seismogram trace, minor adjustments of the model network, starting with the uppermost layers and proceeding toward deeper layers, may be made to make the synthetic seismogram resemble the field seismogram as closely as possible.

When such adjustment is completed, a first difference trace is preferably recorded showing the small differences remaining between the field seismogram trace and the synthetic or model trace as a function of record time. Next, one or more of the deepest reflections of the synthetic seismogram are eliminated by a suitable adjustment of the model, for example, by adjusting the boundary-condition elements of the model to produce zero reflected energy at the selected deep boundary or boundaries. Thereafter, a second difference trace is recorded representing the difference between the new synthetic seismogram trace produced by the model and the field trace. Comparison of this second difference trace with the first difference trace will then show the exact times of occurrence of the primary reflections eliminated in the model trace but still present in the field seismogram, which primary reflections may otherwise be indistinguishable from the multiple reflections produced by shallower reflecting boundaries.

For more exactly depicting the precise difference introduced by the elimination of the selected boundary, a third difference trace representing the difference between the first and second difference traces as a function of time may be recorded.

By eliminating successively shallower reflecting interfaces in the model and making a series of corresponding difference traces in succession, the corresponding primary reflections remaining in the field record may be accurately identified and timed.

This will be better understood by reference to the accompanying drawings forming a part of this application and showing illustrative embodiments of the invention, as well as some modifications thereof, and its manner of use. In these drawings, FIGURE 1 is a diagrammatic vertical cross-section of a layered earth showing certain wave-travel paths therethrough;

Figure 1:
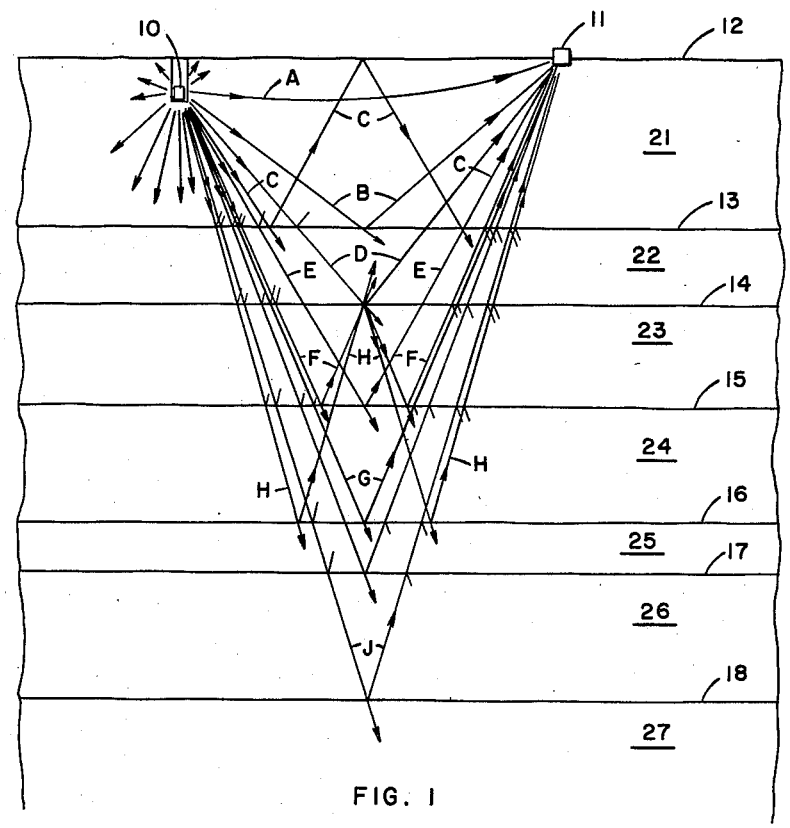

Referring now to these drawings in detail and particularly to FIGURE 1 thereof, this figure shows diagrammatically certain representative wave paths through a layered earth shown in cross-section, between a shot point 10 and a receiver 11 situated some distance apart at or near the surface of ground 12. As is well known, the ground below the surface 12 is ordinarily not homogeneous but is made up of a series of layers here represented as having boundaries 13 to 18, inclusive, between the respective layers 21 to 27, inclusive. In conventional seismic geophysical surveying, a strong seismic-wave front or impulse is originated at shot point 10, and the resulting seismic waves are subsequently received at reception point 11 and recorded in any suitable way, for example, as one of several traces on magnetic tape, as a function of time of arrival.

As appears in FIGURE 1, seismic energy leaves the shot point 10 in substantially all directions, indicated diagrammatically by the radial arrows, but only certain small parts of this energy travel in the proper directions to reach the receiver 11. A number of the likely travel paths between source 10 and receiver 11 are shown in the figure. Thus, a direct wave travels between the source and receiver along the line A entirely within the layer 21. Another prominent arrival is the reflection from the base of this layer at interface 13 traveling along the path B. If, as is frequently true, interface 13 and ground surface 12 are fairly strongly reflecting interfaces, however, there is another path C by which some of the energy from shot point 10 may reach the receiver 11. As path C is substantially longer than B, the energy traveling along C will arrive considerably later than that following B.

This is a relatively simple example of a multiple-reflection wave path, since path C involves two more reflections than path B, one being from the surface 12 downwardly and the other from the interface 13 upwardly. Before the arrival of energy along path C however, a primary reflection traveling along the path D will normally have been received from the strongly reflecting interface 14 between layers 22 and 23. Still somewhat later will be the arrival of an impulse traveling along path E and being reflected as a primary reflection from the interface 15. It is here that the difficulties introduced by the multiple reflection C first became apparent, for from the drawing it will appear that paths E and C are similar in length, so that the two arrivals may be quite close together in time. Since the pulse forms actually observed in field recording occupy substantial time intervals, there is a strong possibility that the multiple reflection along path C will interfere with and distort the wave form of the primary reflection received over path E.

Another possible reflection path is path F. Along this path the seismic energy reverberates once between the boundaries 14 and 15 before finally traveling upward to the receiver 11. Thus, energy along path F arrives substantially later than that along E in spite of the fact that it penetrates no deeper than to the boundary 15. Thus, it is quite likely that the arrival along path F may interfere and be confused with the direct reflection arrival along path G produced by the interface 16. A still further possibility of multiple reflections involving interface 16 is path H wherein the energy reverberates once between interfaces 14 and 16 before traveling upward to the receiver 11. Energy along this path may be expected to interfere with or obscure a direct reflection impulse traveling along path J from an interface 18 substantially below 16.

From the foregoing, some insight should now be apparent into the possible complexities of an ordinary field seismogram involving a number of spaced strongly reflecting interfaces. In fact, as is indicated by the short line emerging from each point of intersection of a ray path with one of the boundaries 13 to 18 inclusive, some reflection of seismic energy takes place from every point along each boundary. However, as is suggested by the short arrows close to the primary reflection points and extending radially from the shot point 10, much of the energy incident on each of the boundaries 13 to 18 passes on through in the downward direction, and only somewhat smaller amounts are reflected upwardly toward the receiver 11.

Even that which is reflected upwardly toward receiver 11, however, undergoes some loss by reflection downwardly again from the various interfaces between the primary reflection point and the receiver, so that it is not at all surprising that the energy of the received waves is an exceedingly minute fraction of that emitted from the shot point 10. It might even be remarkable, furthermore, that interference between primary and multiple reflections is not observed more frequently than it is in practice, since there are many areas where multiple reflections appear to give little difficulty. There are other areas, however, where interpretation of the seismic field records is rendered not only difficult but virtually impossible by strong multiple reflections, which substantially overwhelm the weaker primary reflections received from underlying interfaces. It is to the improvement of seismic surveying results in the latter areas that the present invention is principally directed, but it may also be utilized in determining to what extent unrecognized multiple reflections are present in areas of good primary reflections.

As a first step in discriminating against multiple reflections and in favor of primary reflections in accordance with my invention, it is necessary that there be a model of the layered earth being investigated, which model is capable of generating a synthetic seismogram trace that includes both primary and multiple reflections present in the field record made from the layered earth itself. Such a model must not only approximate the earth's subsurface layering and interface conditions at a particular location, preferably where well-log information as to the depth and nature of the various reflecting interfaces and layers is available, but it must also be readily adjustable to account for variations in these conditions.

Figure 2:
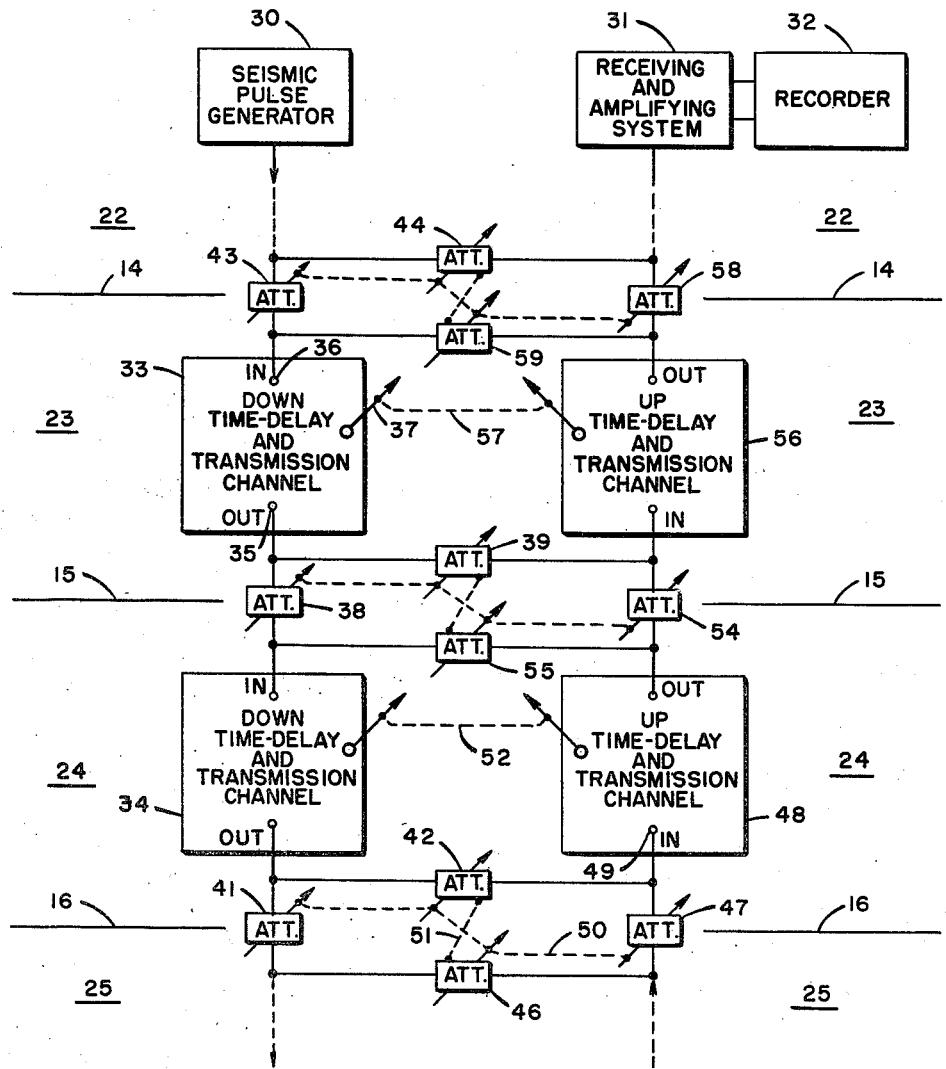
FIGURE 2 is a block diagrammatic illustration of a portion of a model representing the earth cross-section of FIGURE 1.

A portion of one such model is shown in FIGURE 2 in block diagrammatic form. Thus, the model comprises a source 30 capable of generating an impulse of suitable form, which may be the same wave form as a seismic impulse observed traveling through the earth by geophones lowered down deep wells or by any other means by which such impulses may be observed. This corresponds to the shot point 10 at the ground surface 12 of FIGURE 1. The model also includes a receiving and amplifying system 31 connected to and driving a recorder 32 of any suitable form, which elements correspond generally to the receiver 11 of FIGURE 1 and function to accept and record as a function of time the synthetic seismogram wave form delivered to the output terminals of the model.

It will be assumed that the model shown in FIGURE 2 approximates the boundary conditions of the interfaces 14, 15 and 16 of FIGURE 1 and the particular layers 23 and 24 included between these interfaces. These particular layers are chosen for illustrative purposes only, and it will be understood that the entire earth cross-section of FIGURE 1, or any other earth cross-section, is modeled layer by layer by coupling together additional units of the type shown in FIGURE 2. It will further be assumed that the wave travel paths of FIGURE 1 as modeled by the apparatus of FIGURE 2 are vertical travel paths, FIGURE 1 having an exaggerated horizontal scale in order to show the different wave paths without confusion. It is of course well known how to correct seismogram traces for the offset distance between the shot point and any particular receiver or receiver group originating the field-trace data, and it will be assumed that such correction is made before comparing a field trace with the corresponding model trace.

The travel of seismic energy downwardly through the earth layer 23 is modeled by the time-delay and transmission channel 33 of FIGURE 2, while the travel of energy downwardly through the layer 24 is similarly modeled by another time-delay and transmission channel 34. It is the function of time-delay and transmission channel 33 to produce at its output terminal 35 an exact replica of the signal applied to the input terminal 36 after a time delay exactly equal to or proportional to the one-way travel time of seismic waves through the layer 23. This exact time delay is set into the unit 33 by an adjusting element 37 in accordance with the travel time, either assumed for trial and error purposes, or actually determined from measurements such as the data provided by a continuous velocity log of a well intersecting the layer 23. From such a log the thickness D of the layer and the average seismic wave velocity V therein can be directly determined, and the travel time T in the layer is then readily computed from the relation $$T = \frac{D}{V}$$

The boundary conditions for the transmission and reflection of earth particle motion at the boundary 15 can also be determined from the acoustic or velocity log by calculating or reading off the change or difference in acoustic impedance of the layers 23 and 24. These conditions are determined in the model by the setting of suitable controls such as the two attenuators 38 and 39 connected to the output terminal 35 of channel 33. Thus, the setting of control 38 is made proportional to the relative amplitude of that part of the particle motion which is transmitted across boundary 15 into layer 24. The setting of control 39 is established by the calculated or assumed reflection coefficient of the boundary 15. It is made proportional to the amplitude of that part of the particle motion incident upon the boundary 15 which is reflected back from the boundary into the layer 23.

It will be understood that the control 39 must include not only means for approximately the amplitude of the reflected particle motion but also its phase with respect to the incident particle motion, in accordance with the nature of the boundary 15, as to whether the change in acoustic impedance in crossing the boundary downwardly is positive or negative. This requirement of phase determination is not applicable to the control 38, since the phase of the particle motion transmitted across the boundary 15, from layer 23 downwardly into layer 24, remains the same regardless of the nature of the boundary.

The time-delay and transmission channel 34 performs for layer 24 the same function that channel 33 does for layer 23. In other words, the output of control 38, representing the amplitude of particle motion transmitted into layer 24, is applied at the input of channel 34 and emerges therefrom after a time delay exactly equal or proportional to the one-way travel time of the seismic impulse in layer 24. The output of element 34 is similarly divided by the controls 41 and 42 into two parts in accordance with the characteristics of the boundary layer 16 between the layers 24 and 25. That is, the portion passing through control 42 is adjusted to correspond in amplitude and phase to the earth particle motion reflected back into the layer 24 by the boundary 16, while that passing through the control 41 corresponds to the amplitude of particle motion transmitted from layer 24 into layer 25.

It may also be noted that the signal corresponding to the downwardly traveling particle motion impinging upon boundary 14 above layer 23 is divided in exactly analogous fashion between controls 43 and 44, respectively simulating the transmitted and reflected portions of the particle motion at boundary 14.

The same treatment is accorded to the signals representing seismic energy reflected from below and coming upwardly through the various layers. Thus, the signal representing the particle motion traveling through layer 25 upwardly and impinging on boundary 16 is divided into a reflected and a transmitted portion by the respective controls 46 and 47. The transmitted signal passing through control 47 is applied to an upward time-delay and transmission channel 48 for the layer 24, which in the same manner as channel 34 delays the signal transmission by exactly the one-way travel time of a seismic impulse through the earth layer 24. Besides receiving the output of control 47, the input terminal 49 of channel 48 is also connected to receive the output of control 42, which corresponds to the upwardly reflected particle motion that is reversed in its downward direction of travel at the boundary 16.

Since the magnitude of the reflection coefficient for the boundary 16 is independent of the direction of wave travel across the boundary, the settings of the various controls 41, 42, 46, and 47 are interrelated, as are the phase characteristics of the reflected signals as determined by the controls 42 and 46. In other words, if the phase of the reflected signal transmitted through control 42 is the same as the transmitted signal going through control 41, then the phase of the reflected signal traversing control 46 must be exactly opposite. That is, the acoustic-impedance change of the boundary 16, if positive for down-traveling seismic waves, must be negative for up-traveling seismic waves, and vice versa. Thus, if it is desired to simplify the model adjustment as much a possible, the controls 41, 42, 46, and 47 can be coupled together for amplitude control as indicated by the dashed line 50, and the two controls 42 and 46 can be interconnected for phase determination as indicated by the dashed line 51.

Further, since the travel time of seismic waves through the earth layer 24 is independent of their direction of travel, the time delay of the two channels 34 and 48 must be identical, so that their delay-setting elements can be interconnected for operation by a single control knob or the like, as is indicated by the dashed line 52. Interconnections between the transmitting and reflection controls 54 and 55 for upward transmission across the boundary 15 can be established with the downward transmission and reflection controls for this boundary, 38 and 39 respectively, in the same way as was done for boundary 16. Similarly, the time-delay adjustment of the upward transmission channel 56 for layer 23 can be ganged with the time-delay setting element 37 by the coupling 57. Likewise, the transmitting and reflection controls 58 and 59 receiving the output of upward delay and transmitting channel 56 can be ganged for simultaneous operation with the control units 43 and 44.

As is believed apparent from the foregoing description, any number of ground layers can be modeled layer by the layer in the same way, simply by providing additional pairs of time-delay and transmission channels, the channels of each pair respectively transmitting downwardly and upwardly the signals received at the channel inputs after a time delay equal to the one-way seismic wave travel time in the corresponding earth subsurface layer. Each channel input includes not only the signal transmitted across the boundary from the adjacent layer, but also that portion of the oppositely traveling energy reflected back into the layer in accordance with the boundary conditions.

Consequently, when an electrical pulse of the proper form is applied by the source 30 to the network made up of a plurality of pairs of time-delay and transmission units coupled by boundary-condition controls or attenuators, all of the pairs of transmission units and the various controls being properly adjusted in accordance with the constants of the various subsurface layers as assumed for trial and error or as revealed by an acoustic well log, the electrical output of the system received by the unit 31 corresponds in most of its essential details with both the primary and the multiple reflections on an actual seismogram received at the surface of the earth being modeled.

Figure 3:
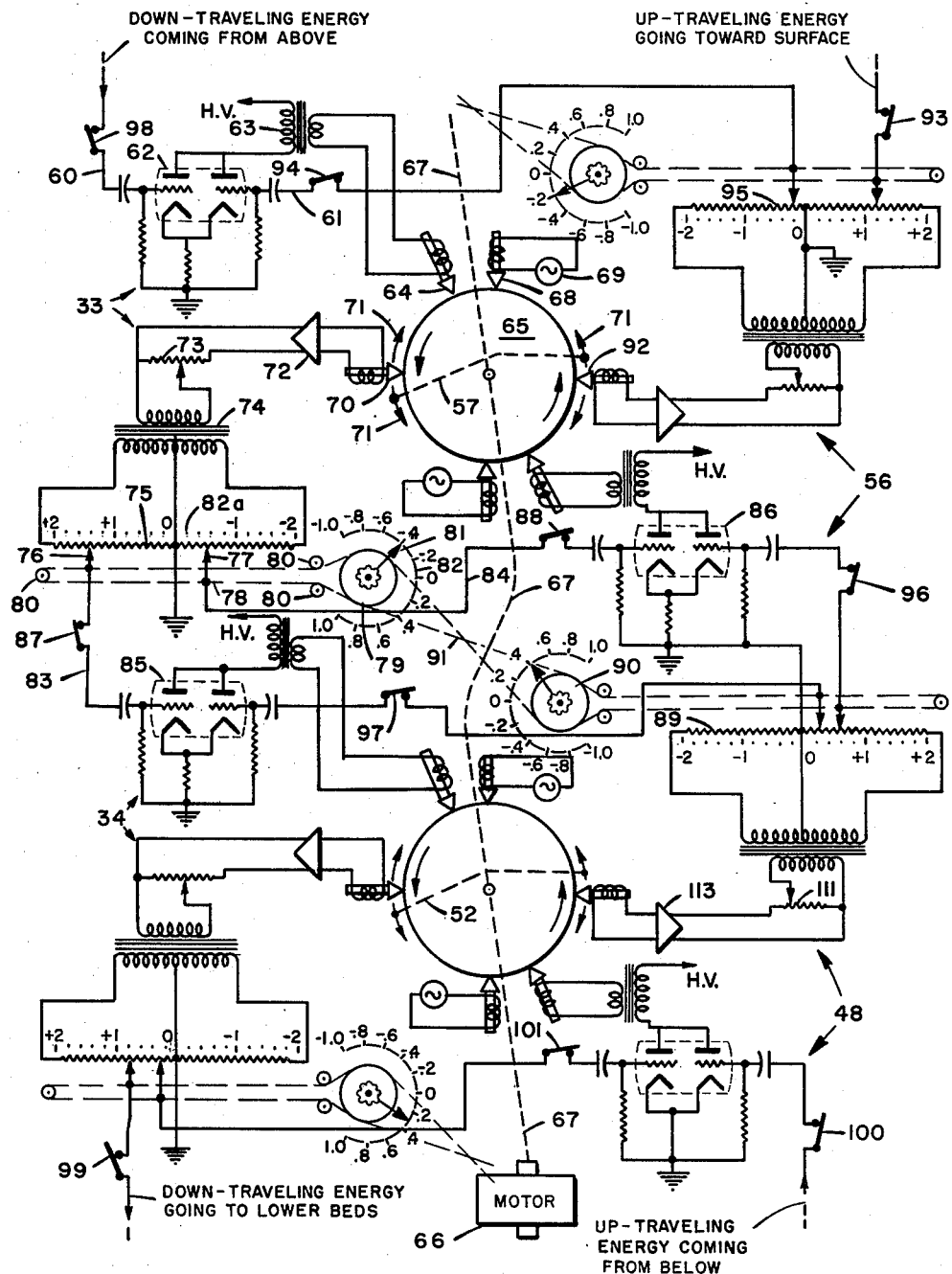
FIGURE 3 is a schematic wiring diagram of one specific form of seismic layered earth model.

Certain further details and some of the schematic wiring diagram of a specific apparatus embodying the invention of FIGURE 2 are shown in FIGURE 3. Thus, an electrical signal representing the down-traveling seismic energy, received either directly from the generator 30 or through intervening down-transmission channels representing shallower strata, appears on the lead 60 and is applied to the control grid of one-half of a dual-triode amplifier tube 62. Similarly, electrical signals on the lead 61, corresponding to the up-traveling seismic signals which are reflected from the boundary are applied to the other grid of the dual triode 62. The combined or added signals accordingly appear at output transformer 63, to which both anodes of the tube 62 are connected, and are fed thence to a magnetic recording element 64 adjacent a rotating magnetic drum or disc 65 driven by a constant-speed motor 66 through an appropriate mechanical connection 67.

Immediately before passing the recording head 64, the surface of the disc or drum 65 is cleared of previously recorded signals by an erasing head 68 fed with high-frequency alternating current from an oscillator 69 in a manner well known in the magnetic-recording art. The signals then recorded by the head 64 on the surface of the disc or drum 65 are picked up by a playback head 70 at a position displaced along the surface of the drum 65 in the direction of its rotation by an amount which is variable in the manner suggested by the arrows 71. Thus, after a time delay depending upon the spacing between head 64 and playback head 70 in relation to the speed of rotation of the drum 65, the recorded signal is picked up, amplified by an amplifier 72, coupled through a gain-equalizing potentiometer or attenuator 73 to a transformer 74 having a center-tapped secondary winding.

The secondary of the transformer 74 is connected across a calibrated, center-tapped linear potentiometer 75 which, besides having its center tap grounded and connected to the center tap of the transformer secondary, is provided with two independently movable sliders or contactors 76 and 77. The latter are equally movable in opposite directions by attachment to a cord 78 passing around a disc or drum 79 and constrained in motion by guides or pulleys 80. Drum 79 carries an index pointer or marker 81 movable adjacent a stationary reflection coefficient scale 82.

For explanatory purposes it may be considered that the markings of scale 82 correspond to the same numbered markings on a scale 82a shown adjacent the potentiometer 75. As pointer or index 81 is rotated from $+1.0$ through zero to $-1.0$, slider 77 similarly moves from $+1.0$ through zero to $-1.0$ along the center portion of potentiometer 75. At the same time slider 76 moves across the left half of the potentiometer 75 between zero and $+2.0$.

The numerical reflection coefficients of scales 82 and 82a correspond to the reflection coefficient R defined by Peterson et al. on page 520 of the above-mentioned reference in Geophysics. In this application, the reflection coefficient R is determined with respect to particle velocity rather than pressure amplitude. That is, the numerical value of the reflection coefficient in the present usage specifies the ratio of the reflected to the incident wave particle motions, while its algebraic sign, whether plus or minus, indicates respectively whether the reflection is of the same or opposite phase relative to the incident and transmitted particle motions.

Taking R as the reflection coefficient in this sense, a transmission coefficient T can be defined as $T=1-R$. T thus defined corresponds to the amplitude of particle motion or velocity in the second medium after the boundary has been crossed. While R is varying between $+1$ and $-1$, T is correspondingly varying between zero and $+2$. Thus, when $R=0$, $T=1$, and the meaning is that there is no reflected energy and no change in amplitude of the seismic-wave particle motion.

When $R=+1$ or $-1$, the reflection is total and the transmission T, or amplitude of particle motion in the second medium, is zero or $+2$ respectively, depending on whether the acoustic impedance of the second medium is infinite (i.e., very large) or zero (i.e. very small). From an inspection of FIGURE 3 where rotation of the drum 79 causes equal and opposite motions of the sliders 76 and 77, it will be apparent that the voltage between contactor 76 and ground corresponds exactly to T as above defined, while that between slider 77 and ground corresponds to R as above defined. With this arrangement also the latter automatically changes phase as it passes the center tap of potentiometer 75, in the same way that the reflection coefficient R changes its algebraic sign in passing through zero. Thus, with this apparatus one setting of the index 81 with reference to the reflection coefficient scale 82, in accordance with the computed value of the reflection coefficient R for a given boundary, or an assumed value thereof for trial and error purposes, automatically establishes the proper amplitudes of both the transmitted and reflected signals corresponding to the transmitted and reflected seismic waves at the modeled earth interface, as well as determining the proper phase of the reflected portion of the signal.

The proper setting of the gain-equalizing potentiometer 73 is preferably made by setting the index 81 to zero value of the reflection coefficient R, so that $T=1$ and the slider 76 is at the $+1$ position of scale 82a. A known signal is then applied to the lead 60, and potentiometer 73 is varied until the signal appearing at slider 76 after a nominal delay is exactly equal to that applied to the lead 60 in amplitude and phase. The leads 83 and 84 from the contactors 76 and 77 respectively apply signals corresponding to the transmitted and reflected seismic waves to the respective dual-triode amplifying tubes 85 and 86. The lead 83 preferably includes a switch 87 and the lead 84 a switch 88 for purposes which will be later described.

As is believed clear, the tube 62, its associated circuit elements and the drum 65 with its recording and playback heads 64 and 70 correspond in a general way to the time-delay and transmission channel 33 of FIGURE 2. The input signals received over the lead 60 correspond to the signals transmitted from attenuator 43 to the unit 33 in FIGURE 2, while the signals present on lead 61 correspond to those received from the attenuator 59. The potentiometer 75, with its two contactors 76 and 77, corresponds in function to the boundary-layer controls 38 and 39 for down-going energy in FIGURE 2.

As will also be clear from inspection of FIGURE 3, the remaining electrical and mechanical components thereon substantially duplicate those which have been described in detail. They respectively make up the units which correspond to the time-delay and transmission channels 34, 48, and 56 of FIGURE 2, together with their respective coupling networks. Thus, besides the upwardly reflected signal traveling over the lead 84 to the dual triode 86 in accordance with the reflection conditions of boundary 15 for down-traveling energy, the triode 86 also receives an input signal from that portion of output potentiometer 89 of unit 48 that corresponds to seismic energy crossing the boundary 15 upwardly. As the reflection coefficient of this boundary for up-traveling energy is the same as for down-traveling energy except for its algebraic sign, the control 90 for potentiometer 89 can be mechanically coupled to control 79 by a reversing connection 91 which gives the controls equal and opposite rotations. This automatically takes care of the reflection phase conditions which are opposite for down-going and up-traveling seismic energy at the boundary 15.

Likewise, the delay of channels 33 and 56 is simultaneously adjusted by the connection 57 between the respective movable playback heads 70 and 92 of these two channels. Each connecting lead between a channel output potentiometer slider and the input of another channel preferably includes a switch corresponding to the switches 87 and 88 in the leads 83 and 84. Thus, there is a switch 93 in the transmission lead and a switch 94 in the reflection lead 61 of the output potentiometer 95 of upward channel 56. Switches 96 and 97 similarly control the transmission and reflection signals from output potentiometer 89, respectively going to the dual triodes 86 and 85. Switch 98 controls transmission along input lead 60 to the triode 62, while switches 99 and 100 control signal transmission respectively downwardly and upwardly through the elements of the model corresponding to boundary 16. Switch 101 controls the upward reflection of down-going signals at this boundary.

Although only two channel-unit pairs, corresponding to the layers 23 and 24 of the earth have been shown, together with the boundary condition adjusting elements between them, it will be apparent how these units are interconnected with exactly similar units for corresponding layers above and below. Thus, when the pulse generator 30 supplies an electrical pulse having a form corresponding to the seismic wave form observed in the earth at some distance from a shot point, this electrical impulse is reflected and transmitted by the various time-delay and transmission channel pairs and by their adjustable coupling units in the same manner as the seismic impulses are transmitted through the corresponding earth layers and reflected at the boundaries between them in the natural earth. Consequently, the form of the electrical waves received by the system 31 and recorded by the recorder 32, preferably in electrically reproducible form, substantially corresponds to the seismic waves received by the receiver 11 from the earth in FIGURE 1, in the substantial absence of surface and other noise waves.

Where a limited number of layers is to be modeled, this magnetic delay system is satisfactory. It has the drawback, however, that noise occurring in any one recording or playback process is repeated in all subsequent playbacks. Since neither the mechanism nor the magnetic recording medium itself is completely noise-free, some distortion of the desired signals by noise is likely to occur in a very large number of recordings and playbacks.

Figure 4:
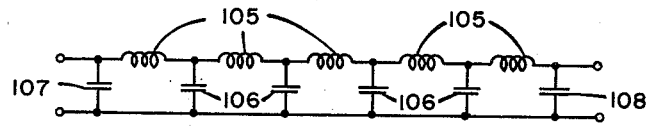
FIGURE 4 is a schematic wiring diagram of an alternative type of delay element.

In FIGURE 4 is shown diagrammatically a more noise-free delay element than the magnetic recording and playback delay system of FIGURE 3. This is the lumped-constant model of an infinite transmission line, consisting of a plurality of series inductances 105 and shunt capacitances 106 connected in a ladder network. This network acts as a low-pass filter, but by choosing inductances 105 and capacitances 106 of sufficiently small size, the frequency cut-off of the filter network can be made sufficiently high so that all frequencies of interest are passed with substantially no phase distortion and with only a small amount of amplitude attenuation. The number of sections used determines the total delay, so that any desired delay is obtained simply by adding or subtracting sections. Reflections within the delay network are avoided by making the terminating capacitances 107 and 108 one-half of the value of the intermediate shunt capacitances 106.

Figure 5:
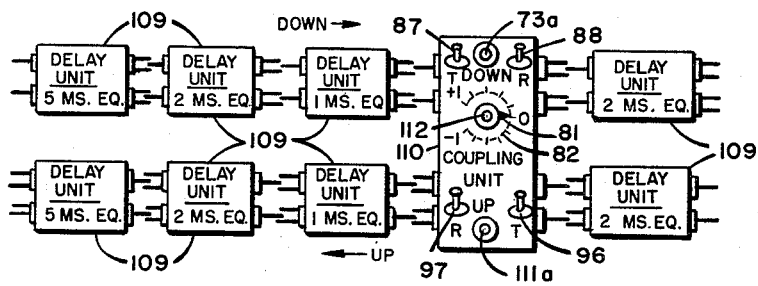
FIGURE 5 is a block diagram of part of a model utilizing delay units of the type shown in FIGURE 4.

For convenience in use, these delay elements are preferably made up in individual blocks or units 109 of various different marked equivalent time delays, as shown in FIGURE 5. Each unit 109 is provided with appropriate electrical connectors, so that as many units as are needed for the desired amount of time delay may be simply plugged together and plugged into or connected to the coupling unit 110.

Figure 6:
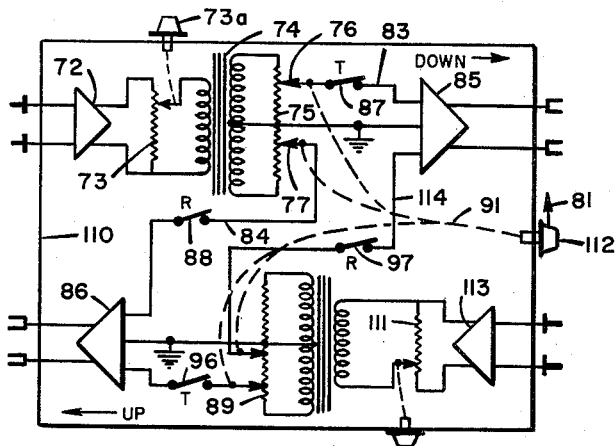
FIGURE 6 is a detailed wiring diagram of the coupling unit of FIGURE 5.

The coupling unit 110 is shown in greater detail in the wiring diagram of FIGURE 6. In this figure the reference numerals used in FIGURE 3 have been applied to the various elements insofar as they correspond to the elements of FGIURE 3 shown for the model of the boundary 15. Thus, the unit 110 essentially comprises two separate connecting links, one corresponding to the downward reflection and transmission across the boundary 15 and the other to the upward reflection and transmission. These are essentially independent except for the connecting leads 84 and 114 which transfer back and forth between the "down" and "up" transmission coupling elements that part of the signal energy which is reflected at the boundary back in the direction whence it came. Such attenuation as is introduced by the delay units 109 is compensated by the amplifier 72 upon adjustment of its output potentiometer 73 by the knob 73a. A similar function is accomplished for up-traveling energy by the amplifier 113 feeding the output potentiometer 111 adjustable by the knob 111a. A single knob 112 moving the index 81 with respect to the downward reflection-coefficient scale 82 accomplishes, by the interconnection 91, simultaneous adjustment of both downward and upward transmission and reflection coefficients on the potentiometers 75 and 89.

It is possible to design the individual delay units 109 to provide delays equal to the actual travel times of the seismic waves in the formation being modeled. Such units, however, tend to be bulky and expensive to manufacture. Accordingly, it is preferable to utilize a scale factor such that the size of the delay units 109 can be reduced for economy and convenience. By using the same scale factor and increasing the frequency of the electrical input signal by this amount without altering its wave form, the same results are provided at the output of the model as would be obtained if actual seismic wave forms and travel times were utilized, provided the time scale of the output record is shifted by the same factor.

Figure 7:
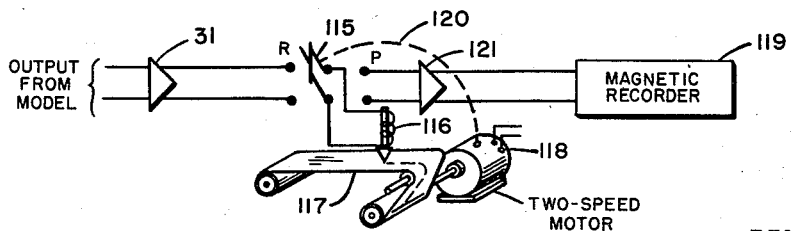
FIGURE 7 is a schematic wiring diagram of a scale changing apparatus.

An apparatus by which this may be accomplished is shown in FIGURE 7. Thus, the output of the model amplified by the amplifier 31 is applied through a double-throw switch 115 to a magnetic recording head 116 adjacent a magnetic recording tape 117 moved by a two-speed motor 118. By a connection indicated as the dotted line 120 the motor 118 operates at its higher speed when switch 115 is thrown to the left in the "Record" position. When switch 115 is thrown to the right in its "Playback" position, motor 118 operates at its lower speed, and playback of the trace recorded on tape 117 is made through the playback amplifier 121 and recorded by a magnetic recorder 119.

The change in scale accomplished depends upon the two speeds of the motor 118. For example, if the recording speed of motor 118 is ten times its playback speed then a scale factor of ten is provided between the input and the output of the system. In other words, the apparent frequencies of the transmitted wave form are reduced by a factor of ten and the apparent record times of events recorded are increased by the same factor. The effect of very large scale factors can be readily achieved by repeated use of the system of FIGURE 7, for example, by utilizing the output of the trace from magnetic recorder 119 as the input to the amplifier 131. Thus, with a 10 to 1 change in speed for the motor 118, a scale factor of 100 can be introduced by two successive passes through the system of FIGURE 7.

From the viewpoint of compactness and economy, it appears that a scale factor of about 100 is advantageous to apply in designing the delay units of FIGURE 5. For example, the 1 millisecond equivalent delay unit would provide an actual delay of about 10 microseconds and would have to pass frequencies up to above 20 kilocycles in order to accommodate actual seismic frequencies of 200 cycles per second. In use, therefore, traces made by the model of FIGURE 5 at high frequencies with proportionally shortened time delays are passed through the system of FIGURE 7 for conversion to the same time scale and frequency range as the field seismic traces to be analyzed.

While magnetic recording and playback with variable head spacing and artificial transmission-line types of delay elements have been shown as means of obtaining adjustable time delays, it is to be understood that these are representative only of a number of possible ways in which the signal energy transmitted through the model system can be delayed by amounts equal to or proportional to the travel time of seismic waves in the layers being modeled. Likewise, other means of introducing the constants of transmission and reflection at the boundaries between the modeled layers may be substituted for those shown in detail.

Figure 8:
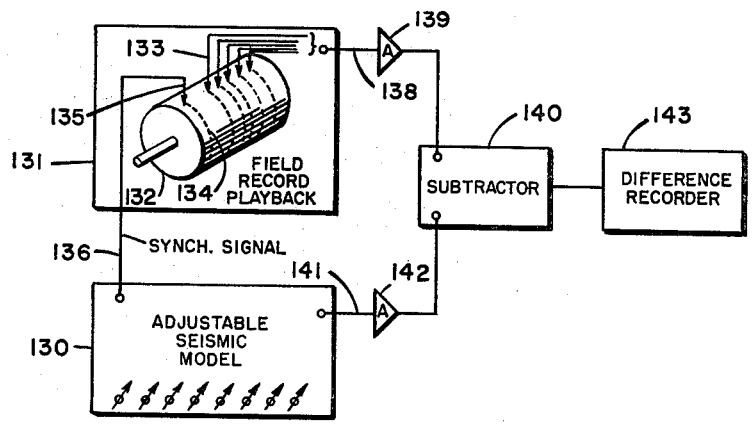
FIGURE 8 is a block wiring diagram of a system utilizing the model of the invention for discriminating against multiple reflections.

In FIGURE 8 is shown diagrammatically a system by which a model constructed in accordance with the foregoing description, or a magnetic recording of a synthetic seismogram trace therefrom, may be utilized for discrimination against multiple reflections received in field seismic recording. It should be emphasized, however, that it is not necessary that the specific models described be used, as any seismic model capable of producing both primary and multiple reflections either directly or as a reproducible trace, and adjustable in accordance with either assumed conditions or the variations of an acoustic log recorded as a function of depth or travel time, can be used to provide the synthetic model information utilized in the apparatus of FIGURE 8.

Thus, the system includes an adjustable seismic model of any suitable form, designated generally by the block 130, and a field-record playback mechanism 131. It will be understood that the magnetic recorder 119 may be substituted for the model 130 where a scaling factor has been used such that the model itself has a different time scale from the field record. The playback mechanism 131 may include a drum 132 on which is placed a field-record tape adapted for reproduction by magnetic playback heads 133 and including a trace 134 suitable for scanning by a separate playback head 135 to transmit over a lead 136 a synchronizing signal to the model 130. By means of this synchronizing signal or impulse the generation of the synthetic seismogram by the model 130 or its playback by the magnetic recorder 119 is performed in synchronization with and at the same time scale as the reproducing of the field record by the heads 133.

In operation, therefore, after adjustment of the model 130 in accordance with an assumed or measured acoustic impedance or velocity log, made in a well at or near a field location where the field record on drum 132 was made, a synthetic seismogram will be produced as a complex wave train in phase with and at the same rate as a chosen one of the field-record traces. The field record trace employed may be any one of the recorded traces or any desired combination of them, in proper time phase to give the best representation of the surface seismic record at the field location. Accordingly, one of the field record trace signals appears on the output lead 138, is amplified to a predetermined level by an amplifier 139 and transmitted to a subtracting network 140. Similarly the synthetic seismic output signal of the model 130 appearing on the lead 141 is amplified by the amplifier 142 to substantially the same signal level and is simultaneously applied to the subtraction circuit 140. The output of this subtraction circuit, which is the difference between the field and the model signals, is then recorded, preferably in the form of an oscillographic trace by the recorder 143.

Figure 9:
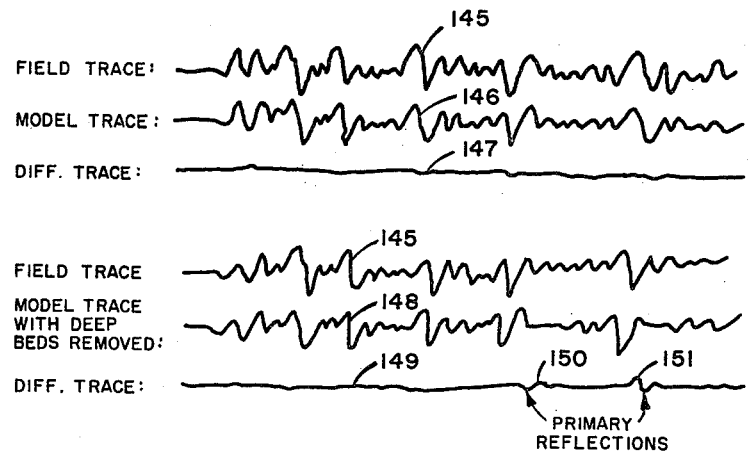
FIGURE 9 shows representative traces recorded in the utilization of the apparatus of FIGURE 8.

In FIGURE 9 is illustrated a number of the traces which might be produced or recorded in the typical manner of utilizing the system of FIGURE 8. Thus, the trace 145 represents the output of playback mechanism 131 transmitted over the lead 138 and corresponds to either a single trace or a combination of two or more of the field traces. The trace 146 is that which is produced by the model 130 through the amplifier 142 after adjustment of the model in accordance with the variations of an acoustic impedance log of the well at the same location where the field record was made. Visible recordings may be made of the traces 145, 146, and 148 if desired, but it is not necessary that this be done, their showing here being primarily for explanatory purposes. The trace 147 represents the difference trace recorded by the recorder 143 if the model 130 is sufficiently closely adjusted to match the thicknesses, velocities, and the reflection coefficients of the actual earth layers which are responsible for the field seismogram being reproduced by the unit 131.

In the event that the differences between the model trace and the field trace are substantial, so that the trace 147 has substantial deviations from zero amplitude, minor adjustments of the model 130 may be made, both as to delay times for the various beds and as to the reflection coefficients at the boundaries, so as to reduce the difference trace 147 more nearly to zero. These adjustments of the model are preferably made by starting with the delay and reflection units representing the uppermost layer of the geologic section, and then proceeding downwardly layer by layer. This is because it is the upper layers which are responsible for the multiple reflections received at later times on the record, and accordingly adjustment of these upper layers for their primary reflecting properties also affects their ability to produce the later arriving multiple reflections.

When the first difference trace 147 has been reduced as nearly as possible to a trace of zero amplitude, the adjustment of the model 130 is then modified so as to eliminate from the synthetic seismogram trace one or more of the deepest primary reflections of interest. Preferably this is done by opening one or more appropriate coupling-unit switches, in this case the ones corresponding to the switch 88 of FIGURES 3, 5, and 6. With this adjustment made, a new trace 148 may be observed corresponding to the output of amplifier 142 to the subtractor 140. The difference recorder 143 will then record a second difference trace 149 on which the departures from the first difference trace 147 may be observed as the primary reflections 150 and 151 whose interfaces were in effect removed from the model.

That this is the result produced by this system may be understood by considering that the field trace 145 includes both primary and multiple reflections, but in such an overlapping fashion that neither one is identifiable by its own character. Similarly, the first model trace 146, adjusted to match the field trace as closely as possible, includes both primary and multiple reflections. When the second model trace 148 is made, however, with the beds responsible for reflections 150 and 151 removed, the only energy appearing on the trace 148 at the time of occurrence of these primary reflections is due to multiple reflections produced by shallower interfaces. Consequently, in the subtraction process these secondary reflections present in traces 145 and 148 cancel each other, whereas the primary reflections do not similarly cancel because they are not present in trace 148. Therefore, their appearance on trace 149 as reflections 150 and 151 permits their identification and timing in spite of the presence of stronger multiple reflections in the field trace 145.

The primary reflections corresponding to the interfaces removed in the model may sometimes be further enhanced by recording an additional or third difference trace, corresponding to the difference between the traces 147 and 149, in instances where the trace 147 shows substantial deviation from zero amplitude. In this way the lack of a perfect balance between the synthetic and field traces does not obscure the primary reflections from any removed interface, since the difference between the first and second difference traces shows only the effect of interface removal, and any lack of balance on the two original difference traces cancels out.

In order to identify successively shallower primary reflections, the model 130 is further adjusted step by step to eliminate successively shallower reflecting interfaces, at each step recording another difference trace 149 to show the new primary reflections. Thus, the use of a conveniently adjustable seismic model in the manner described is a powerful tool for discriminating against multiple reflections and distinguishing weak primary reflections in the present of strong multiples.

In view of the foregoing discussion, it will also be apparent that the model 130 can be adjusted in other ways and combined with the field-record traces so as to show other relationships between primary and multiple reflections. Thus, any given shallow primary reflecting interface may be removed from the model and its effect on the subsequent portions of the model trace observed as an indication of its role in generating multiple reflections. Furthermore, due to the fact that the switches 88 and 97 for each coupling unit control the upward and downward reflecting properties of an interface separately, it is possible to evaluate the role of any interface as an upward reflector of multiple energy independently of its action as a downward reflector. When the properties of several shallow reflecting interfaces have been thus separately evaluated both for upwardly and downwardly traveling energy, it may be found that partial or total elimination of only a few of the most strongly reflecting interfaces from a seismic model will reduce the multiple reflections to a level of insignificance. A difference trace will result on which the remaining primary reflections stand out strongly enough so that their proper timing on the corresponding field record trace can be directly ascertained.

Thus, referring to FIGURE 1, by eliminating only the downward reflections from interface 14, the model trace will show primaries D, G, and J, without interference from multiplies F and H, while on the difference trace F and H will stand out alone and be recognized for what they are. Conversely, eliminating only the upward reflections from interface 14 will make primary D stand out alone on the difference trace. Eliminating the upward reflections of interface 13 will uncover primary E in the model trace, while making the primary B and multiple C stand out by themselves in the difference trace. From its early arrival compared with C, B will then be recognized as the primary reflection from interface 13. In these several ways, which are illustrative of only a few of the many possible ways of combining field and model data to interpret complex reflection patterns, many individual and overlapping reflections can be identified as to their true significance.

Another advantage of this type of adjustable model resides in the provision of the transmission switches 87 and 96. By opening these switches at any place in the model, all energy returns corresponding to seismic reflections from deeper interfaces are completely eliminated, so that seismic energy received at times later than the primary reflections from these interfaces must certainly be considered due to multiple reflections from shallower interfaces. In view of the foregoing, it is apparent that still further modifications and variations of the disclosed embodiments will be apparent to those skilled in the art. The scope of the invention therefore should not be considered as limited to the specific details described, but it should be properly ascertained from the scope of the appended claims.

I claim:

1. A seismic model for one subsurface earth layer having upper and lower boundaries where incident seismic-wave energy is partially transmitted and partially reflected, said model comprising two adjustable time-delay and transmission channels each having time-delay characteristics representative of seismic wave propagation of energy so as to transmit signals simulating a seismic impulse traveling in said layer with a time delay proportional to the one-way travel time of seismic waves through said layer, said two channels corresponding to said layer when transmitting seismic particle motion respectively downwardly and upwardly, adjustable electrical network means coupled to the output of each of said channels for dividing said output into two portions which correspond to the earth particle motions respectively reflected by and transmitted across one of said boundaries, and connecting means between said output-dividing means of each of said channels and the input of the other of said channels for applying to said input the signals representative of said reflected earth-particle motions.

2. A seismic model comprising a source of simulated seismic signals, a receiver for said signals, a plurality of time-delay and transmission channels, and coupling units connecting said time-delay and transmission channels in series and to said source and to said receiver; each of said time-delay and transmission channels corresponding to a subsurface earth layer when transmitting seismic particle motion in only one direction therethrough and comprising adjustable means for delaying a signal applied to its input in proportion to the one-way travel time of seismic waves through said layer; each of said coupling units corresponding to a layer boundary and comprising adjustable electrical network means for dividing the signal energy received by said coupling unit into two portions respectively proportional to the transmitted and the reflected components of the seismic particle motion incident at said boundary; means associated with said dividing means for adjusting the phase of the one of said two portions corresponding to said reflected component; and electrical connecting means between said dividing means and the channel input representing seismic wave transmission through said layer in the direction opposite to that from which said reflected component portion was derived.

3. A seismic model to which is applied a simulated seismic input signal and from which is delivered to a signal receiver a synthetic seismic record trace, said model comprising a plurality of sections connected in series to simulate a corresponding plurality of earth layers and the corresponding reflecting interfaces between them, each of said sections corresponding to one of said layers when transmitting seismic particle motion respectively downwardly and upwardly and comprising a down signal-transmission channel and separate therefrom an up signal-transmission channel, each channel being adjustable and having time-delay characteristics representative of seismic wave propagation of energy so as to provide a time delay to a signal impressed at its input, a first adjustable electrical control connected to the output of said down transmission channel, a second adjustable electrical control connected between the output of said down transmission channel and the input of said up transmission channel, a third adjustable electrical control connected to the output of said up transmission channel, and a fourth adjustable electrical control connected between the output of said up transmission channel and the input of said down transmission channel, said first and third adjustable electrical controls respectively being connected to the inputs of the down and up transmission channels in the sections corresponding to adjacent earth layers respectively below and above said layer.

4. A seismic model to which is applied a simulated seismic signal, and out of which is delivered to a signal receiver, a synthetic seismic record trace, said model comprising a plurality of sections adapted to simulate a corresponding plurality of earth layers and means connecting said sections in series adapted to simulate the reflecting interfaces between said layers, at least one of said sections corresponding to one of said layers when transmitting seismic particle motion respectively downwardly and upwardly and comprising a down signal time-delay and transmission channel and separate therefrom an up signal time-delay and transmission channel, each of said channels being adjustable and having time-delay characteristics representative of seismic wave propagation of energy so as to provide a time delay to a signal impressed on its input, electrical circuit control means connected to the output of said down transmission channel for dividing said output into two parts in predetermined relationship, one of said parts being applied to the input of said up transmission channel and the other of said parts going to the down transmission channel of the next adjacent section, electrical circuit control means connected to the output of said up transmission channel for dividing the output therefrom into two parts in predetermined relationship, a first part being applied to the input of said down transmission channel, and a second part being applied to the input of the up transmission channel of the next adjacent section.

5. A seismic model comprising a plurality of series-connected sections, at least one of which sections simulates a seismic wave transmitting earth layer with upper and lower reflecting boundaries, said section comprising four principal circuit elements connected in series in a closed loop, one of said elements including a down time-delay and signal transmission channel corresponding to said layer when transmitting seismic particle motion downwardly and having time-delay characteristics representative of downward seismic energy propagation so as to receive a simulated seismic signal and to transmit same with adjustable time delay, a first electrical control means connected to the output of said channel for transmitting an adjustable portion of said output, an up time-delay and signal transmission channel having its input connected to said first electrical circuit control means and having adjustable time delay, said up channel corresponding to said layer when transmitting seismic particle motion upwardly and having time-delay characteristics representative of upward seismic energy propagation, a second electrical circuit control means connected to the output of said up time-delay and signal transmission channel for transmitting a portion of said output to the input of said down time-delay and signal transmission channel, a third electrical circuit control means connected to the output of said down time-delay and signal transmission channel for controlling the signal energy transmitted therefrom to the input of a down time-delay and signal transmission channel of one adjacent section, and a fourth electrical circuit control means connected to the output of said up time-delay and signal transmission channel to control the signal energy transmitted therefrom to the up time-delay and signal transmission channel of another adjacent section.

6. A seismic model comprising a plurality of series-connected sections, at least one of which sections simulates a seismic-wave-transmitting earth layer terminated by reflecting upper and lower boundaries, said section comprising first and second time-delay and transmission means, each of said means having time-delay characteristics representative of seismic wave propagation of energy so as to transmit with adjustable time delay a simulated seismic signal applied to its input and each of said transmission means corresponding to said layer when transmitting seismic particle motion in only one of two respectively opposite directions therethrough, a first electrical signal control means connecting the output of said first time-delay and transmission means to the input of said second time-delay and transmission means, a second electrical signal-control means connected between the output of said second time-delay and transmission means and the input of said first time-delay and transmission means, a third electrical signal-control means connected to the output of said first time-delay and transmission means, and a fourth electrical signal-control means connected to the output of said second time-delay and transmission means.

7. An electrical analog of a subsurface earth layer adapted to simulate the transmission of seismic waves into and out of said layer and the reverberation of said waves within said layer, said electrical analog comprising a pair of adjustable time-delay and signal transmitting means, a pair of adjustable electrical resistance networks each connected between the output of one of said pair of transmitting means and the input of the other of said pair of transmitting means, and an adjustable electrical impedance network connected to the output of each of said time-delay and signal-transmitting means for simulating the transmission of seismic energy across the layer boundaries.

8. A seismic model for a plurality of subsurface earth layers having seismic wave-reflecting boundaries between said layers, said model comprising a plurality of time-delay and transmission channels arranged in pairs with each pair corresponding to one layer of said plurality of layers, the two channels of said pair corresponding to said one layer when transmitting seismic particle motion respectively downwardly and upwardly, the time delay of each channel of said pair being proportional to the one-way travel time of seismic waves in said one layer; a plurality of coupling units each for connecting one channel of a pair to the corresponding channel of an adjacent pair, each of said coupling units comprising means for dividing the output of one of said time-delay and transmission channels of said pair into two portions, one portion being proportional to the particle motion transmitted across the corresponding subsurface interface into an adjacent layer, and the other portion being proportional to the particle motion reflected at said interface and remaining within said one layer; a connecting lead extending from said coupling unit to the input of the corresponding time-delay and transmission channel for an adjacent layer for applying thereto said transmitted portion, a connecting lead extending from said coupling unit to the input of the other of said pair of time-delay and transmission channels for applying thereto said reflected portion, a source of simulated seismic signals connected to the input of the downward time-delay and transmission channel of the pair of channels corresponding to the uppermost earth layer, and a signal receiver connected to the output of the upward time-delay and transmission channel of said pair of channels.

9. A seismic model for a subsurface earth layer having upper and lower boundaries where incident seismic-wave energy is partially transmitted and partially reflected, said model comprising a magnetic record-receiving medium, means for moving said medium at a substantially constant speed, a pair of magnetic recording heads adjacent said medium, a pair of magnetic reproducing heads adjacent said medium each at a given spacing from one of said recording heads in the direction of motion of said medium, means for adjusting said spacing in proportion to the one-way travel time of seismic waves in said layer, a pair of amplifiers each connected to receive the output of one of said reproducing heads, a pair of adjustable voltage-dividing means each connected to receive the output of one of said amplifiers, each of said voltage-dividing means having two output leads, one lead carrying a voltage proportional to the seismic-wave particle motion transmitted across one of said boundaries and the other lead carrying a voltage corresponding in phase and proportional in amplitude to the seismic-wave particle motion reflected at said one of said boundaries back into said layer, and means for applying the voltage of said other lead to the one of said pair of magnetic recording heads from which said voltage was not derived.

10. A seismic model for two subsurface earth layers separated by a boundary where incident seismic-wave energy is partially transmitted and partially reflected, said model comprising a first down-transmission channel and a first up-transmission channel corresponding respectively to the transmission of seismic particle motion downwardly and upwardly through the upper of said two layers, each of said first channels being adjustable and adjusted to delay the transmission of a signal from the channel input to the channel output in proportion to the one-way travel time of seismic waves through said upper layer, a second down-transmission channel and a second up-transmission channel corresponding respectively to the transmission of seismic particle motion downwardly and upwardly through the lower of said two layers, each of said second channels being adjustable and adjusted to delay the transmission of a signal from the channel input to the channel output in proportion to the one-way travel time of seismic waves through said lower layer, a first and a second adjustable voltage-dividing unit each having one input and two output terminals, a first connection between said first down-channel output and said first-unit input, a second connection between one of said first-unit outputs and said second down-channel input, a third connection between the other of said first-unit outputs and said first up-channel input, a fourth connection between said second up-channel output and said second-unit input, a fifth connection between one of said second-unit outputs and said first up-channel input, and a sixth connection between the other of said second-unit outputs and said second down-channel input, said voltage-dividing units being adjusted to transmit over said second and fifth connections signals proportional to seismic particle motions transmitted respectively downwardly and upwardly across said boundary, and over said third and sixth connections signals corresponding in phase and proportional to the seismic particle motions reflected by said boundary back into said upper and lower layers respectively.

11. A seismic model as in claim 10 wherein said voltage-dividing units include linkages to a single control member whereby the amplitudes and phases of signals traversing said second, third, fifth, and sixth connections are varied simultaneously.

12. A seismic model as in claim 10 wherein each of said second, third, fifth, and sixth connections includes a switch whereby said each connection can be broken independently of the others.

13. A seismic model for a subsurface earth layer having upper and lower boundaries where incident seismic-wave energy is partially transmitted and partially reflected, said model comprising two ladder networks of series inductances and shunt capacitances each having time delay characteristics representative of seismic wave propagation of energy so as to transmit electric waves simulating the seismic waves traversing said layer in one of two respectively opposite directions with a time delay proportional to the one-way travel time of said seismic waves in said layer, amplifying means for compensating the attenuation of each of said ladder networks, means for dividing the output of each of said neworks into two portions respectively corresponding in phase and proportional in amplitude to the seismic waves transmitted across and reflected by a corresponding one of said boundaries, and means for applying the reflective-wave portion of each network output to the input of the other of said networks.

14. The method of seismic geophysical surveying which comprises the steps of generating and receiving seismic waves at a field surveying location, recording said waves in reproducible form, adjusting the layer and the boundary constants of an adjustable seismic model in accordance with a travel-time log of the variations in acoustic impedance with depth made in the vicinity of said field surveying location until said model produces a synthetic seismogram trace substantially matching the field-record trace recorded at said location, recording a first difference trace proportional to the differences between said field-record trace and said first synthetic seismogram trace, varying the adjustment of said model to produce a second synthetic seismogram trace omitting the reflections from at least one of the reflection-producing boundaries of said model, and recording a second difference trace proportional to the difference between said field-record trace and said second synthetic seismogram trace, whereby the differences between said first and second difference records, corresponding to the reflection of said field record omitted from said second synthetic seismogram trace, are emphasized.

15. A method as in claim 14 wherein said adjustment-varying step comprises adjusting said model to omit in said second synthetic seismogram trace only the upwardly reflected signals of one reflection-producing boundary, whereby the differences between said first and second difference records, including the primary reflection from said one boundary, are emphasized.

16. A method as in claim 14 wherein said adjustment-varying step comprises adjusting said model to omit in said second synthetic seismogram trace only the downwardly reflected signals from said boundary, whereby the differences between said first and second difference records corresponding to the boundary reflections produced by said boundary, are emphasized.

17. A method as in claim 14 including the further step of producing a third difference trace proportional to the differences between said first and second difference traces.

18. A method as in claim 14 wherein said adjustment-varying step comprises repeatedly readjusting said model to omit in each of a plurality of successively recorded record synthetic seismogram traces reflections from at least one significant reflection-producing boundary of said model starting with the deepest boundary and proceeding upwardly, and recording an additional second synthetic seismogram trace after each said readjusting step.

19. A method as in claim 18 including the further steps of recording a plurality of third difference traces each proportional to the difference between each two successive second synthetic seismogram traces.

References Cited in the file of this patent

UNITED STATES PATENTS

| | | |
|---|---|---|
| 2,263,376 | Blumlein | Nov. 19, 1941 |
| 2,355,826 | Sharpe | Aug. 15, 1944 |
| 2,834,422 | Angona | May 13, 1958 |
| 2,885,023 | Walker | May 5, 1959 |
| 2,916,724 | Peterson | Dec. 8, 1959 |
| 3,009,527 | Berryman et al. | Nov. 21, 1961 |